(12) United States Patent
Ishikawa

(10) Patent No.: US 7,572,992 B2
(45) Date of Patent: Aug. 11, 2009

(54) LEVER SWITCH

(75) Inventor: Shuichiro Ishikawa, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 12/219,093

(22) Filed: Jul. 16, 2008

(65) Prior Publication Data
US 2009/0020398 A1  Jan. 22, 2009

(30) Foreign Application Priority Data
Jul. 20, 2007 (JP) .............................. 2007-190070

(51) Int. Cl.
*H01H 9/00* (2006.01)
(52) U.S. Cl. ................... 200/61.54; 200/61.27
(58) Field of Classification Search .............. 200/61.54, 200/61.27
See application file for complete search history.

(56) References Cited

U.S. PATENT DOCUMENTS 5,828,021 A * 10/1998 Uchiyama et al. ........ 200/61.54
6,617,534 B2 * 9/2003 Goff et al. ................ 200/61.54
6,747,221 B2 * 6/2004 Ichimura ................ 200/61.54
6,849,818 B2 * 2/2005 Koide et al. ................ 200/564
6,921,872 B2 * 7/2005 Rudolph et al. .......... 200/61.54

FOREIGN PATENT DOCUMENTS

JP  2003-162945  6/2003

\* cited by examiner

*Primary Examiner*—Kyung Lee
(74) *Attorney, Agent, or Firm*—Rader Fishman & Grauer PLLC; Ronald P. Kananen

(57) ABSTRACT

A lever witch comprises first and second rotary levers arranged in outer and inner peripheries of the non-rotary lever, a base mounted in a tip end side of the non-rotary lever and a rotary knob supported by a tip end side of the second rotary lever and rotating together therewith. A through bore is formed in the base for penetrating in a lever rotational axis direction between the rotary knob and the first rotary lever, a pair of contact balls are provided in the through bore to be respectively arranged exposed to both ends of the through bore to put a coil spring between the pair of contact balls, and detent convex is provided in a rotational direction in the rotary knob to be exposed to one end of the through bore and resiliently contact the contact ball, and a contact edge section is provided along a rotational direction in the first rotary lever to be exposed to the other end of the through bore and resiliently contact the contact ball.

6 Claims, 3 Drawing Sheets

LEVER SWITCH

CROSS-REFERENCE TO RELATED APPLICATION

This application is based on Japanese Patent Application No. 2007-190070 filed on Jul. 20, 2007, the disclosure of which is incorporated herein by reference.

BACKGROUND INVENTION

1. Field of the Invention

The present invention relates to a lever switch mounted in a steering column for an automobile.

2. Description of Related Art

There is known this type of conventional lever switch which is provided, for example, with a hollow non-rotary lever a base end side of which is supported by a switch body mounted to a steering column side, a first rotary lever arranged in an outer periphery of the non-rotary lever, a second rotary lever arranged in an inner periphery of the non-rotary lever, a base mounted in a tip end side of the non-rotary lever and a rotary knob supported by a tip end side of the second rotary lever The rotary knob and the first rotary lever activate in relation to a wiper operation and detent mechanisms are provided between each of the rotary knob and the first rotary lever, and a stationary base.

Here, an interior of the lever switch is structurally complicated and also is provided with many components which are placed to be closely positioned therein. Therefore, it is imperative to reduce the number of the interior components even by one piece.

However, there is a limit to reducing the number of the interior components attributable to the detent mechanism equipped in each of the rotary knob and the first rotary lever (refer to JP2003-162945A).

In view of the above, there exists a need for a lever switch which overcomes the above-mentioned problem in the related art. The present invention addresses this need in the related art as well as other needs, which will become apparent to those skilled in the art from this disclosure.

SUMMARY OF THE INVENTION

Therefore, the present invention is made in view of the foregoing problems and it is an object of the present invention to provide a lever switch which can reduce the number of interior components in the lever switch.

According to a first aspect of the present invention, a lever switch comprises a hollow non-rotary lever a base end side of which is supported by a switch body mounted to a steering column side, a first rotary lever arranged in an outer periphery of the non-rotary lever, a second rotary lever arranged along an inner periphery of the non-rotary lever, a base mounted in a tip end side of the non-rotary lever and a rotary knob supported by a tip end side of the second rotary lever and rotating integrally with the second rotary lever, wherein a through bore is formed in the base for penetrating in a lever rotational axis direction between the rotary knob and the first rotary lever. The lever switch further comprises a pair of contact bodies provided in the through bore to be respectively arranged exposed to both ends of the through bore, a resilient element sandwiched between the pair of the contact bodies, a detent configuration section provided in a rotational direction in the rotary knob to be exposed to one end of the through bore and resiliently contact one of the pair of the contact bodies, and a contact edge section provided along a rotational direction in the first rotary lever to be exposed to the other end of the through bore and resiliently contact the other of the pair of the contact bodies.

In consequence, the pair of the contact bodies can be urged by the common resilient element to be resiliently in contact with the detent configuration section of the rotary knob and the contact edge section of the first rotary lever, therefore enabling further reduction in the number of the interior components to be realized. That is, the object of the further reduction in the number of the interior components for the lever switch can be realized by the sharing of the common resilient element.

According to a second aspect of the present invention, groove sections may be arranged in a lever rotary circumferential direction at both ends of the through bore in the base, wherein the detent configuration section and the contact edge section each resiliently contact the contact bodies within the respective the groove sections.

In consequence, the detent configuration section and the contact edge section can resiliently contact the respective contact bodies securely.

According to a third aspect of the present invention, a stopper projection may be provided outside of one end or the other end of the through bore of the base to project in an inner diameter direction in such a manner as to prevent the contact body from dropping out.

In consequence, upon assembly, the dropout of the contact bodies can be prevented, thereby enabling easy assembly of the lever switch.

According to a fourth aspect of the present invention, the first rotary lever and the rotary knob may be arranged for edge sections thereof to be opposed to each other.

In consequence, the positioning between the first rotary lever and the rotary knob allows a clearance adjustment between the edge sections of the first rotary lever and the rotary knob to be easily performed, so that a dimensional management on a basis of the positioning between the first rotary lever and the rotary knob can facilitate the visual setting of the opposing arrangement of the edge sections without a clearance thereof.

BRIEF DESCRIPTION OF THE DRAWINGS

Other objects, features, and advantages of the present invention will become more apparent from the following detailed description made with reference to the accompanying drawings, in which like portions are designated by like reference numbers and in which.

DETAILED DESCRIPTION OF THE EXAMPLE EMBODIMENTS

Hereinafter, an embodiment of the present invention will be explained with reference with the drawings.

First Embodiment

Figure 1:
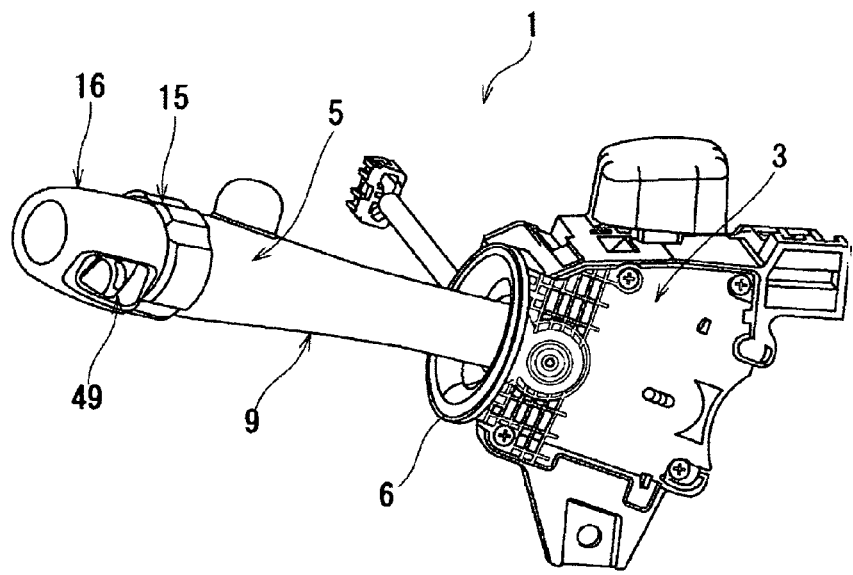
FIG. 1 is a perspective view showing a lever switch in a first embodiment of the present invention.

As shown in FIG. 1, a lever switch 1 is configured in such a manner that a control lever 5 is supported by a switch body 3. The switch body 3 is attached to the side of a steering column and the control lever 5 is used as a whole for turn signal switching and for head light switching control. A boot 6 attached to the switch body 3 is provided at a base end side of the control lever 5.

Figure 2:
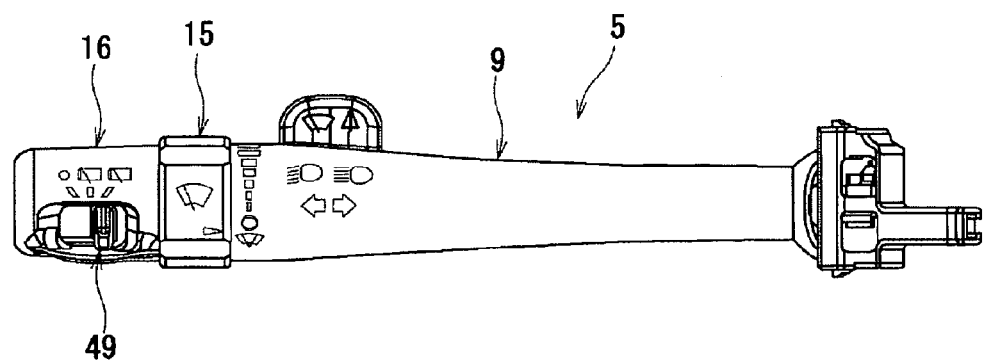
FIG. 2 is a side view showing a control lever in the first embodiment.
Figure 3:
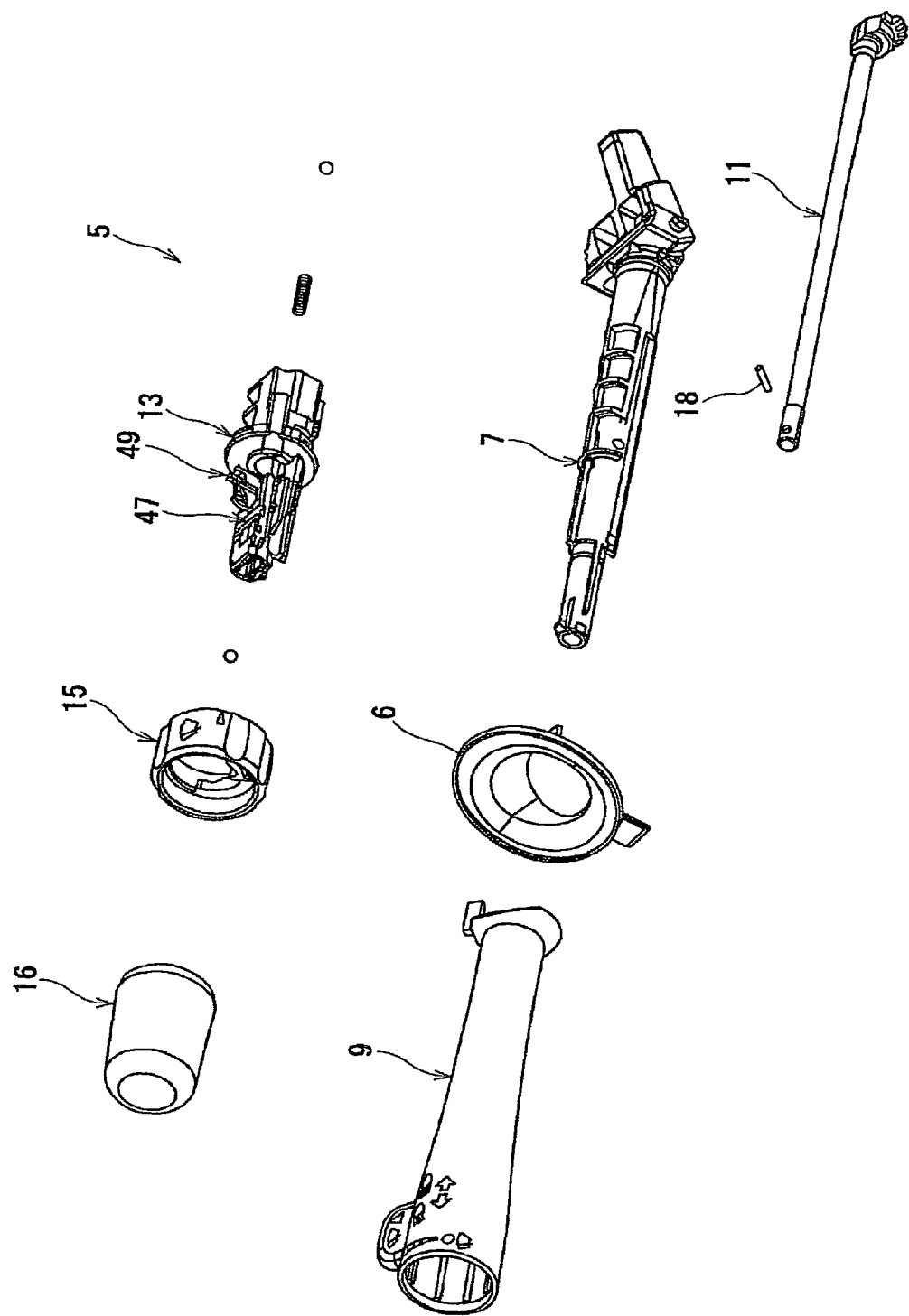
FIG. 3 is an exploded perspective view showing the control lever in the first embodiment.

As shown in FIGS. 1 to 3, the control lever 5 is provided with a non-rotary lever 7, first and second rotary levers 9 and 11, a base 13, and a rotary knob 15 and further, a non-rotary knob 16 adjacent to the rotary knob 15.

The non-rotary lever 7 is formed in a hollow shape and has a base end supported to the switch body 3 to be capable of swinging, but does not rotate around an axis.

The first rotary lever 9 is arranged along the outer periphery of the non-rotary lever 7 to be ratable. Rotational operation of the first rotary lever 9 allows a wiper washer to be ejected to a front windshield. The returning rotation of the rotational operation of the first rotary lever 9 is made in a counter rotational operation direction by an automatic returning mechanism provided in the side of the switch body 3. This automatic returning mechanism is arranged in the conventional structure and therefore, the detailed explanation is omitted.

The second rotary lever 11 is arranged in an inner periphery of the non-rotary lever 7. The base 13 is attached to the tip end side of the non-rotary lever 7. The rotary knob 15 is jointed and supported to the tip end side of the second rotary lever 11 by a pin 18 to rotate integrally therewith. Rotating the rotary knob 15 causes the second rotary lever 11 to move together, thus controlling an operation of a wiper.

Figure 4:
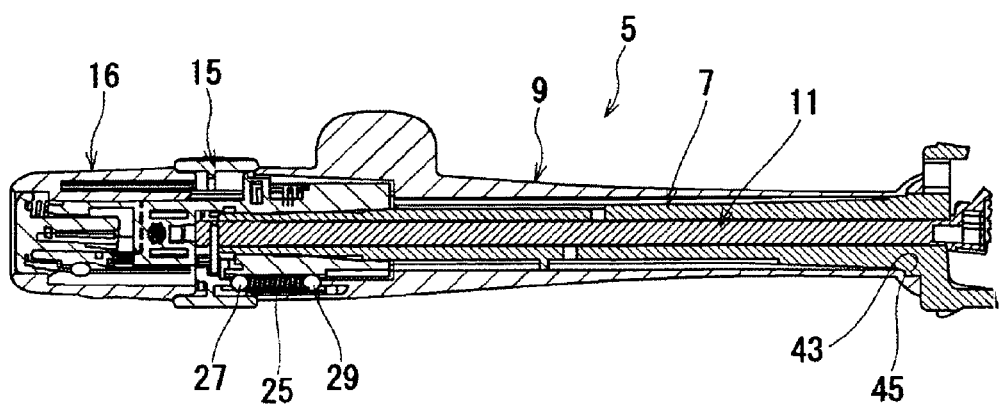
FIG. 4 is a cross section showing the control lever in the first embodiment.
Figure 5:
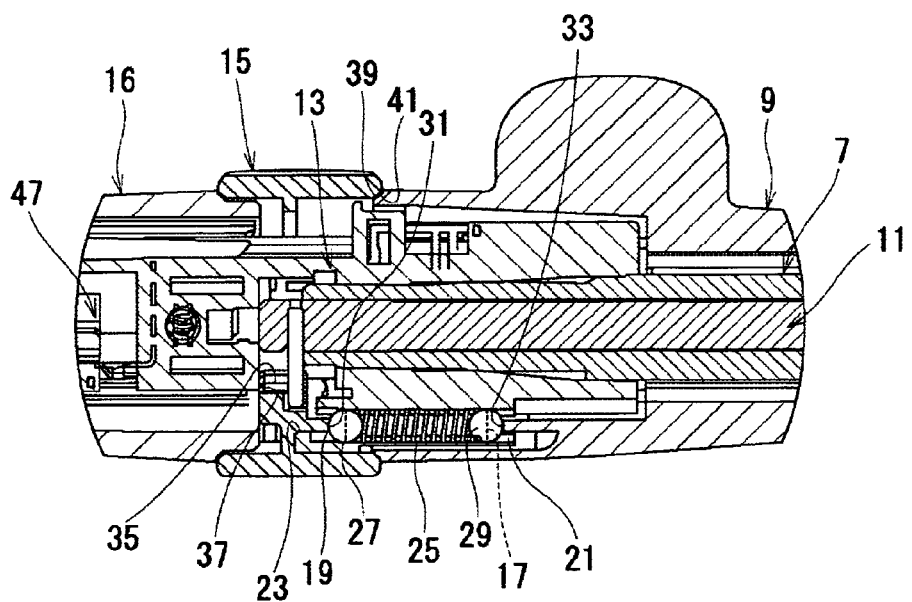
FIG. 5 is a partially enlarged cross section showing the control lever in the first embodiment.

As shown in FIGS. 4 and 5, a through bore 17 is formed in the base 13 between the rotary knob 15 and the first rotary lever 9 to penetrate in the lever rotational axis direction. Groove sections 19 and 21 are provided in the rotational circumferential direction at both ends of the through bore 17 to be opposed to the rotary knob 15 and the first rotary lever 9. A stopper projection 23 is provided outside of the groove 19 as one side of the through bore 17 to project in an inner diameter direction, thus prevent the dropout of a contact ball 27. The projection 23 may be provided outside of the groove section 21 as the other side of the through bore 17 in place of the outside of the groove section 19.

A coil spring 25 as a resilient element is inserted in the through bore 17, and contact balls 27 and 29 made of steel or the like as contact bodies are arranged to put the coil spring therebetween. The contact balls 27 and 29 are configured to be partially exposed from the groove sections 19 and 21.

Detent convexes 31 as detent configuration sections are provided in the rotary knob 15. For example, the plural convexes 31 in number in accordance with an operation of the rotary knob 15 are formed in the rotational direction and are exposed to one side of the through bore 17 to resiliently contact the contact ball 27 in the groove section 19.

A contact edge section 33 is provided in the first rotary lever 9. The contact edge section 33 is formed in a flat shape in the rotational circumferential direction on the contact edge and is exposed to the other side of the through bore 17 to resiliently contact the contact ball 29 as the other contact body in the groove section 21. It should be noted that the contact edge section 33 may be formed in an detent convex shape.

The rotary knob 15 is configured so that a part 35 of the interior in the rotary knob 15 is in contact with a sliding section 37 of the base 13.

Edge sections 39 and 41 of the first rotary lever 9 and the rotary knob 15 are arranged to be opposed to each other without a clearance therebetween. An engagement section 43 is provided at the base end of the first rotary lever 9 and is in contact with a stopper stepped section 45 provided at the base end of the non-rotary lever 7.

It should be noted that a terminal 47 is provided in the base 13 and also the non-rotary knob 16 is fixed to the base 13. A slide knob 49 which can move straight is arranged in the non-rotary knob 16. The slide knob 49 is configured to be capable of getting in contact with the terminal 47 to activate a head light wiper by a slide operation.

(Assembly)

Upon assembly, the contact ball 27, the coil spring 25 and the contact ball 29 are inserted in that order from the side of the groove section 21 into the through bore 17. Even if the detent convex 31 of the rotary knob 15 is not arranged in the side of the groove section 19 upon this assembly, the ball 27 which has moved from the side of the groove section 21 to the side of the groove section 19 inside the through bore 17 can contact the projection 23 to prevent the contact ball 27 from dropping out.

(Detent Function or the Like)

When the rotary knob 15 rotates, the contact ball 27 resiliently contacts the detent convex 31 by an urging force of the coil spring 25. The urging force of the coil spring 25 inputted into the rotary knob 15 is received by the contacting of a part 35 of the interior in the rotary knob 15 with the sliding section 37 of the base 13.

Accordingly, since the contact ball 27 thus resiliently contacts the detent convex 31, the rotary knob 15 can be operated to rotate with a detent feeling.

When the rotary knob 15 is rotated, the second rotary lever 11 can be rotated together with the rotation of the rotary knob 15 through a pin 18.

In regard to the first rotary lever 9, the contact ball 29 resiliently contacts the contact edge section 33 to urge the first rotary lever 9 in a direction along the rotational axis. This urging causes the engagement section 43 to be pushed against the stepped section 45 of the non-rotary lever 7, thus positioning the first rotary lever 9.

In consequence, the mutual positioning between the rotary knob 15 and the first rotary lever 9 can be made through the resilient contact of the rotary knob 15 with the sliding section 37 of the base 13 and the resilient contact of the first rotary lever 9 with the stepped section 45.

The first rotary lever 9 is automatically rotated back in the counter rotational operation direction by the automatic returning mechanism in the side of the switch body 3 after being operated. The returning force of the automatic returning mechanism does not act in the rotational axis direction of the first rotary lever 9. Therefore, the first rotary lever 9 tends to easily generate the loose in the rotational axis direction, but the loose can be securely prevented by the urging force in a direction along the rotational axis to the contact edge section 33.

Advantage of the Embodiment

According to the present embodiment, a lever switch 1 comprises a hollow non-rotary lever 7 a base end side of which is supported by a switch body 3 mounted to a steering column side, a first rotary lever 9 arranged in an outer periphery of the non-rotary lever 7, a second rotary lever 11 arranged in an inner periphery of the non-rotary lever 7, a base 13 mounted in a tip end side of the non-rotary lever 7 and a rotary knob 15 supported by a tip end side of the second rotary lever 11 and rotating integrally with the second rotary lever 11, wherein an assembly through bore 17 is formed in the base 13 for penetrating in a lever rotational axis direction between the rotary knob 15 and the first rotary lever 9. The lever switch 1 further comprising a pair of contact balls 27 and 29 provided in the through bore 17 to be respectively arranged exposed to both ends of the through bore 17, a coil spring 25 sandwiched between the pair of the contact balls 27 and 29, an detent convex 31 provided in a rotational direction in the rotary knob 15 to be exposed to one end of the through bore 17 and resiliently contact the contact ball 27, and a contact edge section 33 provided along a rotational direction in the first rotary lever 9 to be exposed to the other end of the through bore 17 and resiliently contact the contact ball 29.

In consequence, the pair of the contact balls 27 and 29 can be urged by the common coil spring 25 to be resiliently in contact with the detent convex 31 of the rotary knob 15 and the contact edge section 33 of the first rotary lever 9, therefore enabling further reduction in the number of the interior components to be realized with the sharing of the coil spring 25.

The groove sections 19 and 21 are arranged in a lever rotational circumferential direction at both ends of the through bore 17, wherein the detent convex 31 and the contact edge section 33 each resiliently contact the contact balls 27 and 29 within the respective groove sections 19 and 21.

In consequence, the detent convex 31 and the contact edge section 33 can resiliently contact the respective contact balls 27 and 29 securely.

The stopper projection 23 is provided outside of one end of the through bore 17 of the base 13 to project in an inner diameter direction.

In consequence, upon assembly, the dropout of the contact balls 27 and 29 and the coil spring 25 can be prevented, thereby enabling easy assembly of the lever switch 1.

The first rotary lever 9 and the rotary knob 15 are arranged for the edge sections 39 and 41 thereof to be opposed to each other. In consequence, the positioning between the first rotary lever 9 and the rotary knob 15 allows a clearance adjustment between the edge sections 39 and 41 of the first rotary lever 9 and the rotary knob 15 to be easily performed, so that a dimensional management on a basis of the positioning between the first rotary lever 9 and the rotary knob 15 can facilitate the visual setting of the opposing arrangement of the edge sections without a clearance thereof.

(Others)

The groove sections 19 and 21 and the projection 23 may be omitted.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A lever switch comprising:
a hollow non-rotary lever a base end side of which is supported by a switch body mounted to a steering column side,
a first rotary lever arranged in an outer periphery of the non-rotary lever;
a second rotary lever arranged along an inner periphery of the non-rotary lever;
a base mounted in a tip end side of the non-rotary lever; and
a rotary knob supported by a tip end side of the second rotary lever and rotating integrally with the second rotary lever, wherein a through bore is formed in the base for penetrating in a lever rotational axis direction between the rotary knob and the first rotary lever, further comprising:
a pair of contact bodies provided in the through bore to be respectively arranged exposed to both ends of the through bore;
a resilient element sandwiched between the pair of the contact bodies;
an detent configuration section provided in a rotational direction in the rotary knob to be exposed to one end of the through bore and resiliently contact one of the pair of the contact bodies; and
a contact edge section provided along a rotational direction in the first rotary lever to be exposed to the other end of the through bore and resiliently contact the other of the pair of the contact bodies.

2. A lever switch according to claim 1, wherein:
groove sections are arranged in a lever rotary circumferential direction at both ends of the through bore in the base, wherein the detent configuration section and the contact edge section each resiliently contact the contact bodies within the respective groove sections.

3. A lever switch according to claim 2, further comprising:
a stopper projection provided outside of one end or the other end of the through bore in the base to project in an inner diameter direction in such a manner as to prevent the contact body from dropping out.

4. A lever switch according to claim 2, wherein:
the first rotary lever and the rotary knob are arranged for edge sections of the first rotary lever and the rotary knob to be opposed to each other.

5. A lever switch according to claim 1, further comprising:
a stopper projection provided outside of one end or the other end of the through bore in the base to project in an inner diameter direction in such a manner as to prevent the contact body from dropping out.

6. A lever switch according to claim 1, wherein:
the first rotary lever and the rotary knob are arranged for edge sections of the first rotary lever and the rotary knob to be opposed to each other.

* * * * *

UNITED STATES PATENT AND TRADEMARK OFFICE
CERTIFICATE OF CORRECTION

| | | |
|---|---|---|
| PATENT NO. | : 7,572,992 B2 | Page 1 of 1 |
| APPLICATION NO. | : 12/219093 | |
| DATED | : August 11, 2009 | |
| INVENTOR(S) | : Shuichiro Ishikawa | |

It is certified that error appears in the above-identified patent and that said Letters Patent is hereby corrected as shown below:

Title Page:
Item (57) Abstract line 1 should read:
--A lever switch comprises first and second rotary levers--.

Signed and Sealed this

Twentieth Day of October, 2009

David J. Kappos
*Director of the United States Patent and Trademark Office*